Dec. 23, 1941.  A. L. J. GHAYE  2,267,647

INDEX HEAD FOR MACHINE TOOLS

Filed July 23, 1940  3 Sheets-Sheet 1

Inventor
Albert Lambert Jean Ghaye
By Frank S. Appleman, Attorney

Dec. 23, 1941.  A. L. J. GHAYE  2,267,647
INDEX HEAD FOR MACHINE TOOLS
Filed July 23, 1940  3 Sheets-Sheet 2

Inventor
Albert Lambert Jean Ghaye
by Frank S. Ackerman,
Attorney.

Patented Dec. 23, 1941

2,267,647

UNITED STATES PATENT OFFICE 2,267,647

INDEX HEAD FOR MACHINE TOOLS

Albert Lambert Jean Ghaye, Leicester, England

Application July 23, 1940, Serial No. 347,019
In Great Britain July 24, 1939

18 Claims. (Cl. 90—58)

This invention relates to dividing or indexing heads for machine tools capable of performing drilling, shaping, grinding, slotting and analogous operations, and has reference more particularly to such heads of the kind wherein an angularly adjustable spindle (hereinafter for convenience referred to as the "head spindle") is adapted to be locked or set in an adjusted position by the engagement of a plunger or the like with one of a circular series of appropriately disposed parts or formations, for a purpose well known to those acquainted with the art concerned.

The invention is mainly intended for application to dividing or indexing heads which are adapted to rotate the work through required angles so that formations such as holes, teeth, recesses, slots, faces and the like can be produced around the work in definite angular relationship.

The object of the invention is to provide improvements in a dividing or indexing head as will be hereinafter described, the principal aim being the provision of a head of the kind referred to which, besides being simple in construction and durable, will be accurate and constant in use.

Broadly considered, the improved dividing or indexing head includes a circular series of rollers, balls or equivalent separate elements arranged for co-operation with the plunger or the like.

Conveniently a circular series of accurately ground and contiguously arranged rollers or balls may be employed for the intended purpose.

The rollers, balls or equivalent are conveniently all of the same size and ground, for example to an accuracy of, say, $\frac{1}{20,000}''$. The idea is, of course, that the angular distance between the central axes or centres of two adjacent rollers, balls or equivalent corresponds to a definite fractional portion of 360°, so that by releasing the plunger or the like and turning the head spindle to the extent of one, two or any predetermined number of rollers, balls or equivalent said spindle is thereby angularly adjusted to the required known degree and can then be set in this position by locking the plunger or the like against the appropriate roller, ball or equivalent. Thus, for instance, if there are 60 contiguously arranged rollers or balls in a circular series then the distance between the central axes or centres of any two adjacent rollers or balls will be 6°. Consequently, if, in these circumstances, it was desired to rotate the head spindle through, say, 18° then it would be necessary for it to be turned to the extent of three rollers or balls. Again, if there are 30 contiguously arranged rollers or balls in a series the angular distance between them is 12°; 72 rollers or balls would each be separated by 5°, and so on.

In the accompanying drawings,

Figure 1 is a front elevational view, partly in section, of a dividing or indexing head embodying a single series of rollers, Figure 2 is a longitudinal sectional view of the same taken on the line II—II of Figure 1, Figure 3 is a general plan view of the head, Figures 4 and 5 are detail sectional views taken on the lines IV—IV and V—V of Figure 1 respectively, Figure 6 is a detail plan view showing, inter alia, a handle by means of which the plunger is operated, and Figures 7 and 8 are detail views illustrating modifications involving the use of spacing slip gauges as will be hereinafter described.

Like parts are designated by similar reference characters throughout the drawings.

Figure 1:
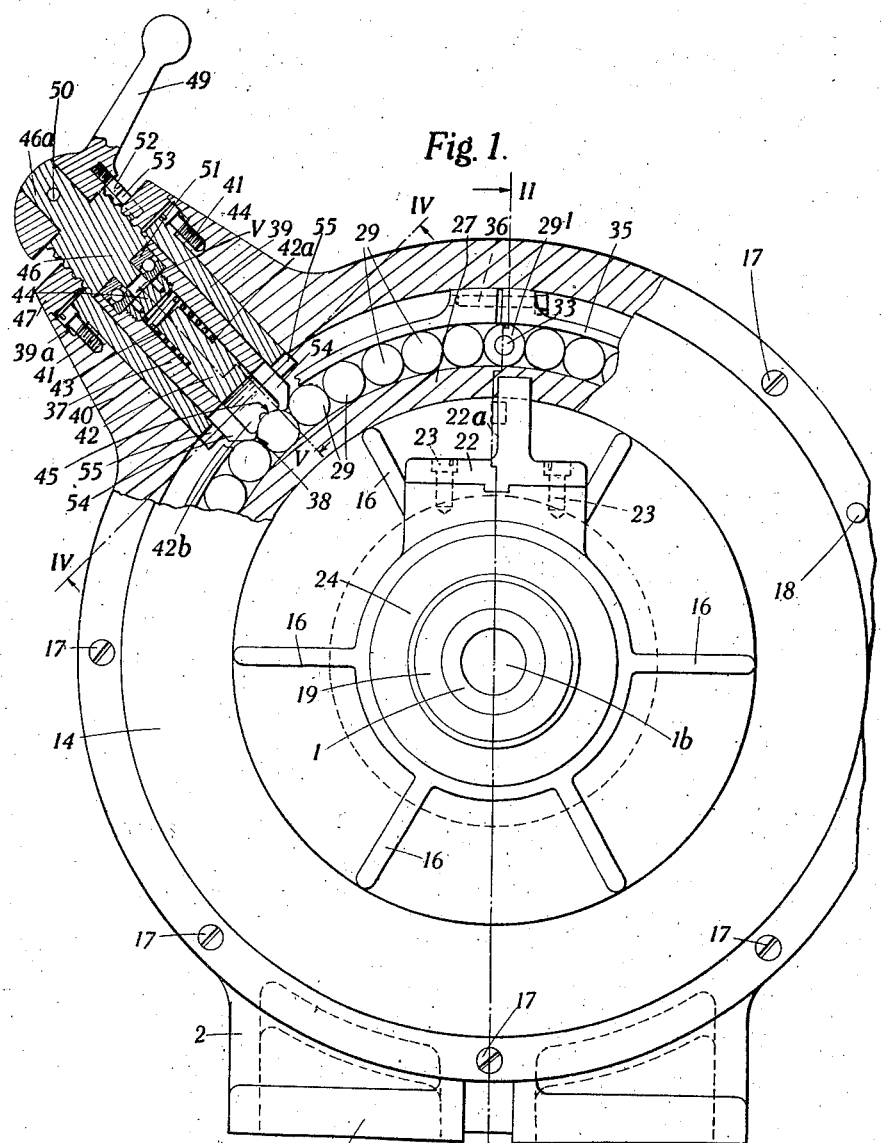

The dividing or indexing head illustrated includes a central head spindle 1 which is accommodated within a casing 2 or body adapted to be secured in position on the particular machine tool or tools with which the head is to be employed. The casing 2 consists of a casting comprising a hollow cylindrical chamber 3, an integral rearwardly extending hollow portion 4 and a base 5. The rear end of the portion 4 has formed integrally therewith a hollow cylindrical housing 6 for the accommodation of a roller or any other suitable anti-friction bearing such as 7 (see Figure 2). A similar anti-friction bearing 8 is provided in a housing 9 which is located in and disposed concentrically with respect to the chamber 3. The head spindle 1 extends through and is revoluble in these bearings. The rear end of said spindle is screw-threaded for engagement with a nut 10 for adjusting the bearing 7 and a lock nut 11. The back of the housing 6 is closed by a centrally bossed cover plate 12 which is secured in position by means of a plurality, say four, screws such as those represented at 13 in Figure 2. A circular cover plate 14 having a central boss or hub 15 and radially disposed strengthening ribs 16 is secured to the front of the chamber 3 by means of screws 17. Conveniently, and as shown in Figure 1, a pin 18 suitably arranged may be provided to locate the cover plate 14 in position when initially applied to the casing 2. The forward end of the head spindle 1 projects through the cover plate 14 and is screw-threaded, as represented more clearly at 1a in Figure 3, to receive an appropriately tapped work piece or work-carrying part (not shown). At such times as the head is not in use the screw-threaded portion 1a may, if desired, be protected by the application thereto of a screwed part such as 19 (see Figures 1 and 2). The head spindle is made hollow and at its forward end is bored at 1b for reception of a tapered work spindle. A bearing bush 20 is interposed between the head spindle 1 and the aforesaid boss or hub 15. Formed integrally with the latter is a support 21 for a work-setting piece such as 22 of any conventional form. The setting piece 22 has a flat surface 22a which is in alignment with the central axis of the head spindle. Screws 23 are employed to attach the setting piece to the support 21. A dial 24, calibrated or graduated in degrees, is provided in conjunction with an index finger or mark to assist the machinist in turning the head spindle to the required extent. Conveniently the said dial has a suitably bevelled periphery and is attached to the head spindle by means of small screws such as 25 (Figure 2).

Figure 2:
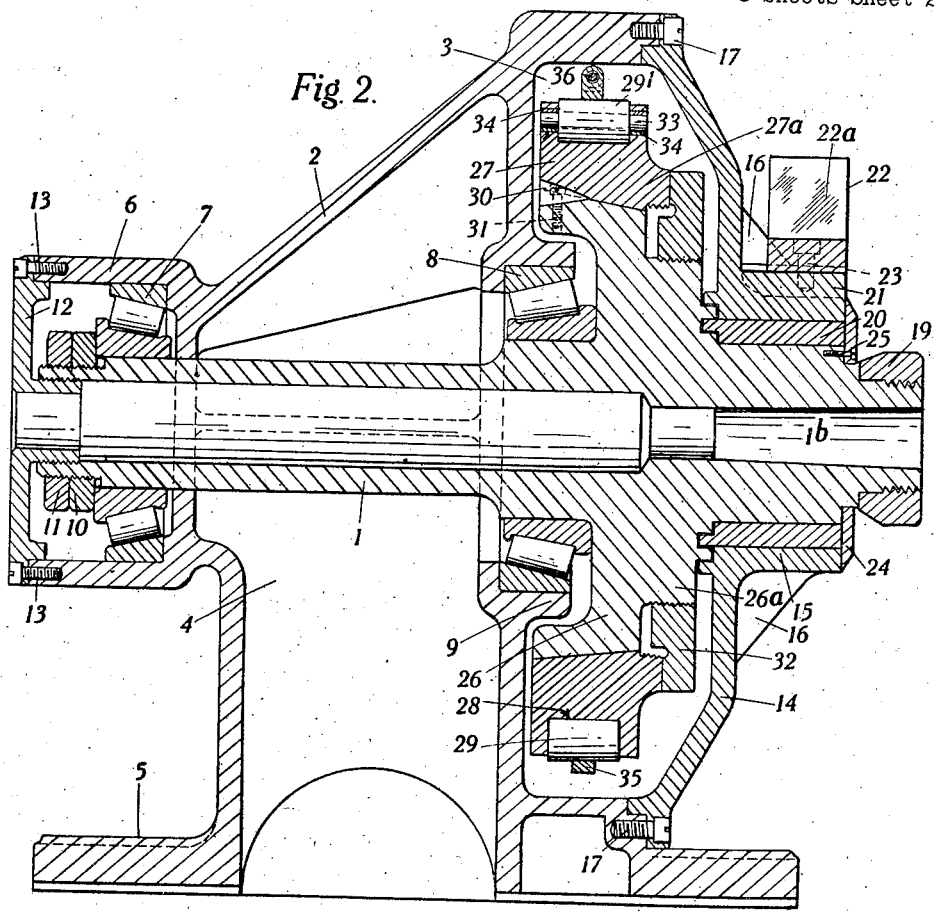
Figure 3:
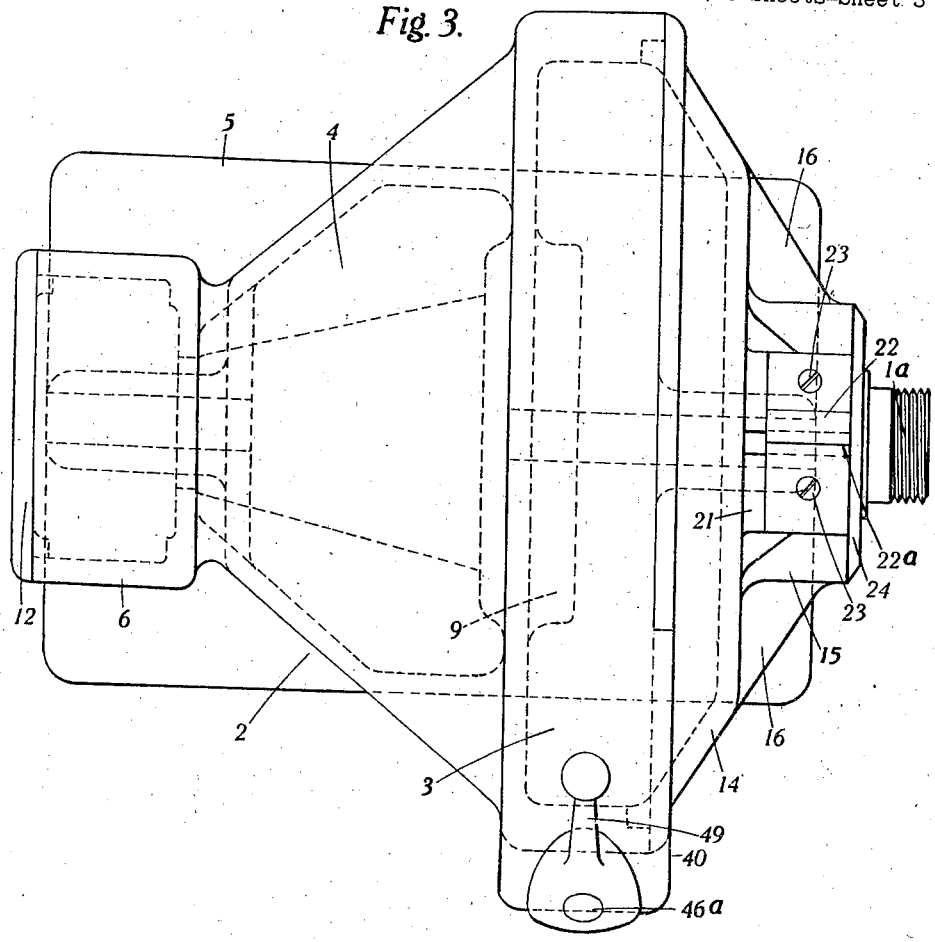

Referring to Figure 2 it will be seen that a wheel-like part 26 of substantial thickness, formed integrally with the head spindle 1, is accommodated in the cylindrical chamber 3. The periphery of this part is flanged and also bevelled somewhat to support a correspondingly bevelled indexing ring 27. This ring is made of suitably hardened metal and is peripherally grooved at 28 for reception of a circular series of small, accurately grounded rollers 29. The wheel-like part 26 and the indexing ring 27 are properly positioned relatively to each other by means of a locating key 30 which is attached to the part 26 by means of a screw 31. A locking ring or plate 32 which is screwed onto an appropriately screw-threaded portion 26a of the wheel-like part 26 serves to maintain the indexing ring 27 in position. The groove 28 is of the cross-sectional form represented in Figures 2 and 5, and the rollers 29 are arranged contiguously, i. e. so that adjacent rollers touch each other in the manner shown in Figure 1. The axes of the rollers are parallel with respect to the axis of the head spindle. One of the rollers, viz. that indicated at 29¹, is permanently fixed in the ring 27 for which purpose it is mounted upon a small spindle 33 the opposite ends of which project into bushes 34 fixed in said ring. The remainder of the rollers are free to be removed as and when necessary. Means of any suitable character may be employed for maintaining and locking the rollers 29 in position. For example, and as shown, a ring 35 arranged to surround or embrace the series of rollers may be provided to clamp the latter down and as it were lock them together in contiguous relationship. This roller locking ring is split and its opposite ends are suitably enlarged and tapped for reception of a screw 36 by means of which the ring is tightened about the series of rollers. There may be sixty rollers in the series.

To enable the indexing ring 27 to be readily removed from the head as occasion may demand, it is formed with an interiorly screw-threaded bossed portion 27a for engagement with a screwed extractor tool or part (not shown). Of course, before the indexing ring can be extracted it is first necessary to remove both the cover plate 14 and the locking ring or plate 32.

Figure 4:
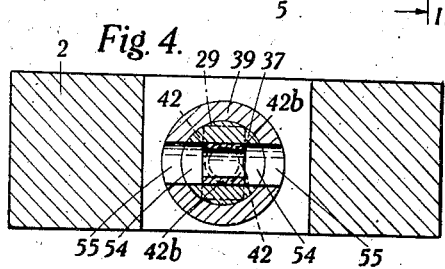
Figure 5:
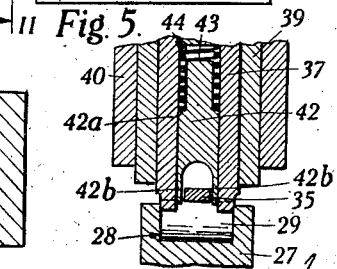
Figure 6:
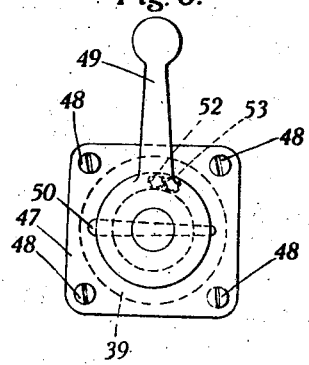

A plunger 37 is provided for cooperation with the rollers 29. The purpose of this plunger, when operative, is to lock the head spindle 1 and hence also the work in position after adjustment. The locking plunger has formed therein at its inner, i. e. operative, end a concave recess 38 (Figure 1) adapted to fit around an opposed portion of the surface of a roller. The locking plunger 37, moreover, is of cylindrical form exteriorly and slidable longitudinally within a suitably flanged bush 39 which is accommodated within a boss 40 formed on the casing 2 and secured in position by means of screws 41 passed through the flange 39a. The locking plunger 37 is bored axially for reception of an independently movable core or central plunger 42. As shown in Figures 1 and 5, a compression spring 43 is arranged to surround a reduced portion of the core or central plunger 42 and is interposed between a shoulder 42a on the latter and the underside of a cap 44 which is screwed into the locking plunger 37. The core or central plunger 42 is channelled or recessed at its inner end as indicated at 45 (Figure 1) to fit the surface of a roller and is also bifurcated or forked at this end as represented more clearly in Figure 5 suchwise as to avoid the roller locking ring 35. The spring 43 therefore performs a dual purpose; it is effective upon the locking plunger 37 and in this respect functions as hereinafter explained, and it also presses upon the core or central plunger 42 in such a way as to urge the latter permanently into contact with the rollers 29. For depressing the locking plunger 37 and rendering it operative to lock the head spindle 1 in an adjusted position there is conveniently provided an operating screw 46 which is arranged to work within a nut 47. This nut is square-shaped and attached by means of screws 48 (Figure 6) to the top or outer end of the boss 40. Integral with the operating screw 46 is a reduced cylindrical portion 46a to which a handle 49 is secured by means of a taper pin 50. The upper or outer end of the locking plunger 37 is counterbored for reception of a thrust bearing 51 which is interposed between the cap 44 and the operating screw 46. Rotation of the handle 49 (and hence also the operating screw) is limited. Such limitation is made effective by the employment of two stop pins 52 and 53 one of which is screwed into the handle and the other into the nut 47. The construction so far described is therefore such that by turning the handle 49 in the appropriate direction the operating screw 46 will act, through the medium of the thrust bearing 51, upon the locking plunger 37 which latter will thereupon be forced downwards against the action of the spring 43 until it is locked with its operative end in contact with one of the rollers 29. In this way movement of the wheel-like part 26 is prevented and the head spindle 1 is accordingly set in an adjusted position. Conversely, by turning the handle 49 in the reverse direction the operating screw 46 will be slackened off and withdrawn sufficiently to release the locking plunger 37, thereby enabling the latter to move under the spring action clear of the rollers so that the head spindle 1 is freed. Rotation of the handle to the extent of a little under a complete revolution (determined by co-operation of the two stop pins 52 and 53) is sufficient for the intended purposes. As will be appreciated, by restricting this rotation any possibility of the operating screw 46 coming adrift from the nut 47 at such times as said screw is operated to release the locking plunger 37 is effectively obviated. It is convenient to explain here that both the plunger 37 and the bush 39 are recessed in such a way as at all times to avoid fouling the roller locking ring 35. Thus, referring to Figures 1 and 4, it will be seen that the lower portion of the plunger 37 is recessed at each side as indicated at 54, while the corresponding portion of the bush 39 is somewhat similarly recessed at each side as indicated at 55. In effect, the space between the two prongs 42b of the bifurcated or forked end of the core or central plunger 42 and the recesses 54 and 55 together constitute a single, transverse channel through which the roller locking ring 35 is permitted to move without fouling any of the parts adjacent thereto; this will be clear from a consideration of Figure 4.

As hereinbefore alluded to the core or central plunger 42 is permanently spring pressed towards the rollers 29. Accordingly, upon rotation of the head spindle 1 during indexing operations the said core or central plunger will idly "click" over the rollers. That is to say, it will at such times move within and independently of the locking plunger 37—alternately against and under the influence of the spring 43 as successive rollers pass by it in contact therewith. Now the purpose of the core or central plunger 42 is to constitute a guide for the locking plunger 37, this guide serving at all times to maintain the locking plunger with its channelled or recessed end correctly disposed with respect to the rollers 29. Conveniently for this purpose, although the major portion of the core or central plunger 42 is of cylindrical form (see dotted lines in Figure 4) the remaining lower portion thereof including the spaced prongs 42b is made substantially square to fit and work within a correspondingly shaped portion of the bore in the locking plunger 37; this also will be clear from Figure 4. Expressed in other words, the lower portion of the core or central plunger 42 and a corresponding hole in the outer locking plunger 37 are formed in a complementary manner suchwise as to prevent relative angular movement between these parts when interengaged. In the result, therefore, the locking plunger 37 is properly guided into contact with a roller against which it is to be locked and, during release of said plunger and consequent movement thereof under the spring action its operative end is effectively prevented from turning and thereby fouling any of the rollers. In this latter respect any unnecessary wear of the rollers is obviated.

From the foregoing description it will be understood that when the handle 49 is slackened off to release the plunger 37, the head spindle 1 and the wheel-like part 26 with the rollers 29 are free to be rotated. When, however, the head spindle has been turned to the required extent, if necessary with the assistance of the dial 24, the handle 49 is turned to lock the plunger 37 against the adjacent roller with the result aforesaid.

Figures 7, 7A:
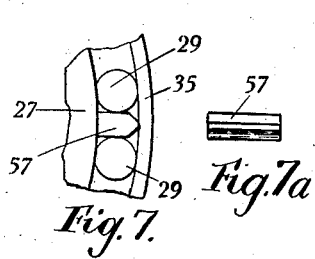
Fig. 7a is a front elevational view of the gauge shown in Figure 7.
Figures 8, 8A:
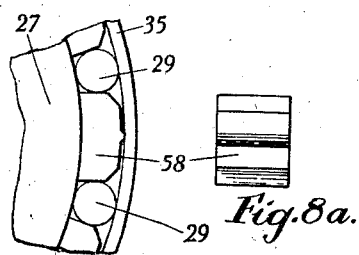
Figure 8a is a front elevational view of the gauge shown in Figure 8.

Now the arrangement so far described only enables the head spindle each time it is turned through a fractional part of a revolution to be rotated through a definite number of degrees constituting a divisor of 360°. While such an arrangement may therefore be eminently suitable for many indexing movements, it will be appreciated that it cannot without modification be adopted when it is required to turn the head spindle through any number of degrees which will not readily divide into 360°. It is within the scope of the present invention, therefore, to provide in conjunction with a dividing or indexing head comprising at least one series of rollers, balls or equivalent separate elements as herein described, means which are so formed and arranged as to be adapted to enable the head spindle to be turned through angles other than those normally provided by a complete series of contiguously arranged elements. For instance, a slip gauge or two or more or a whole set of such gauges all of the same, or some of the same and others of respectively different, lengths circumferentially, may be provided for insertion one or more at a time into a space or spaces provided by the removal of certain of the rollers, balls or equivalent. A slip gauge when inserted serves to maintain spaced rollers, balls or equivalent apart. Thus, as will be understood, by the judicious removal of certain rollers, balls or equivalent from appropriate places and the insertion of slip gauges of known angular extent, the machinist is readily enabled to turn the head spindle to any desired extent and thereby obtain divisions beyond the range of those normally securable. This will be clearer from a consideration of Figure 7 wherein a slip gauge 57 corresponding to a known angular extent is inserted between spaced rollers 29. This slip gauge is of the same length as the rollers (see the view of the gauge at the right-hand side of Figure 7) and has straight, parallel sides. In Figure 8 a slip gauge 58 of considerably larger angular extent than the gauge 57 is shown by way of further exemplification.

In the example illustrated the head spindle 1 is horizontal. It may, however, be vertical. Or it may be arranged for swivelling or like movement through, say, 90° from a horizontal to a vertical disposition, and vice versa.

In an alternative construction (not shown) rotation of the head spindle may be adapted to effect required movements of the work through the medium of gearing or equivalent.

If desired the improved head may be adapted to perform differential indexing for which purpose the construction may be such that a plurality of turns of the head spindle effects one revolution of the work.

An advantage of employing balls, rollers or equivalent elements for the intended purpose as herein described is that worn elements can be readily replaced thereby prolonging the life of the dividing or indexing head and ensuring maximum accuracy at all times. In this connection the indexing ring 27 is extractable in the manner previously described herein to enable worn rollers to be replaced, or to enable one or more of the rollers to be removed and replaced by a slip gauge or gauges. Moreover, a plurality of indexing rings with different set outs of rollers and slip gauges may be provided for use in the improved indexing head at respectively different times.

The improved dividing or indexing head is eminently suitable for use in conjunction with machines for drilling circular series of holes, forming splines on shafts, cutting slots or grooves in or machining faces on circular parts, and for performing many analogous operations with drilling, shaping, grinding, slotting and other machine tools; said head providing a simple and ready means of turning the work through any required angle, so that the faces or formations thereon or therein can be produced in accurate angular relationship.

What I claim then is:

1. For attachment to a machine tool, an indexing head for rotating the work through required angles so that formations can be produced around said work in definite angular relationship, comprising, in combination, a housing, a spindle which is angularly adjustable within said housing and adapted when so adjusted to effect a required movement of the work, at least one circular series of separate elements whose centres are spaced at known angular distances, means for supporting said elements suchwise that the circular series is concentrically disposed with respect to said spindle, a plunger adapted for co-operation with the separate elements, means for locking the plunger against the appropriate element after a desired angular adjustment of the spindle has been made, whereby said spindle is set in its adjusted position, and spring means arranged in association with the plunger in such a way that upon release said plunger will move under the spring action in a direction away from the aforesaid elements, thereby freeing the spindle and enabling it to be turned.

2. For attachment to a machine tool, an indexing head for rotating the work through required angles so that formations can be produced around said work in definite angular relationship, comprising, in combination, a casing, a spindle which is rotatable within said casing and adapted when angularly adjusted to effect a required movement of the work, a wheel-like part which is rotatable with said spindle, a grooved ring which is secured to said part, rollers which are accommodated within the ring with their central axes spaced at known angular distances, means for retaining said rollers within the ring, a plunger which is provided at a relatively fixed location and shaped at its operative end for engagement with one of the rollers, manually operable means for impelling the plunger into engagement with and locking it against the appropriate roller after angular displacement of the spindle to a required extent for the purpose herein specified, and spring means arranged in association with the plunger in such a way that upon release said plunger will move under the spring action in a direction away from the rollers, thereby freeing the spindle and enabling it to be turned.

3. For attachment to a machine tool, an indexing head for rotating the work through required angles so that formations can be produced around said work in definite angular relationship, comprising, in combination, a casing, a spindle which is rotatable within said casing and adapted when angularly adjusted to effect a required movement of the work, a wheel-like part which is rotatable with said spindle, a grooved ring which is secured to said part, rollers which are accommodated within the ring with their central axes spaced at known angular distances, a ring for retaining said rollers in position suchwise that they are immovable relatively to each other, a plunger which is provided at a fixed location in the casing and shaped at its operative end so as to conform to and fit an opposed portion of the peripheral surface of any one of the rollers, manually operable screw means for impelling the plunger into engagement with and locking it against the appropriate roller after angular displacement of the spindle to a required extent for the purpose herein specified, spring means arranged in association with the plunger in such a way that upon release said plunger will move under the spring action in a direction away from the rollers thereby freeing the spindle and enabling it to be turned, and an indicator calibrated in degrees, in conjunction with an index mark, to assist the machinist in turning the spindle to the required extent.

4. For attachment to a machine tool, an indexing head for rotating the work through required angles so that formations can be produced around said work in definite angular relationship, comprising, in combination, a housing, a spindle which is angularly adjustable within said housing and adapted when so adjusted to effect a required movement of the work, a circular series of separate bodies whose centres are spaced at known angular distances, means for supporting said bodies suchwise that the circular series is concentrically disposed with respect to and revoluble with said spindle, and a device for setting and locking the spindle in an adjusted position, said device including a locking member which is adapted to be moved into positive contact with a separate body after a required angular adjustment of the spindle has been effected and to be withdrawn clear of the bodies to release said spindle, and a yieldable member which is so formed and arranged for yielding contact with the bodies as to be adapted to guide and maintain the locking member with its operative end correctly positioned with respect to said bodies.

5. For attachment to a machine tool, an indexing head for rotating the work through required angles so that formations can be produced around said work in definite angular relationship, comprising, in combination, a housing, a spindle which is angularly adjustable within said housing and adapted when so adjusted to effect a required movement of the work, a circular series of rollers whose axes are spaced at known angular distances, means for supporting said rollers suchwise that the circular series is concentrically disposed with respect to and revoluble with said spindle, and a device for setting and locking the spindle in an adjusted position, said device including a locking member which is so shaped at its operative end as to be capable of conforming closely to an opposed portion of the peripheral surface of one of the rollers and is adapted to be moved into positive contact with a roller after a required angular adjustment of the spindle has been effected and to be withdrawn clear of the rollers to release said spindle, and a yieldable member which is similarly formed at its operative end and so arranged for yielding contact with the rollers as to be adapted to guide and maintain the locking member with its operative end correctly positioned with respect to said rollers.

6. For attachment to a machine tool, an indexing head for rotating the work through required angles so that formations can be produced around said work in definite angular relationship, comprising, in combination, a housing, a spindle which is angularly adjustable within said housing and adapted when so adjusted to effect a required movement of the work, a circular series of separate bodies whose centres are spaced at known angular distances, means for supporting said bodies suchwise that the circular series is concentrically disposed with respect to and revoluble with said spindle, and a device for setting and locking the spindle in an adjusted position, said device including a locking member which is bored axially and adapted to be moved into positive contact with a separate body after a required angular adjustment of the spindle has been effected and to be withdrawn clear of the bodies to release said spindle, and a yieldable member in the form of a core which is mounted for movement axially within the bore of the locking member and so arranged for yielding contact with the bodies as to be adapted to guide and maintain the locking member with its operative end correctly positioned with respect to said bodies.

7. For attachment to a machine tool, an indexing head for rotating the work through required angles so that formations can be produced around said work in definite angular relationship, comprising, in combination, a housing, a spindle which is angularly adjustable within said housing and adapted when so adjusted to effect a required movement of the work, a circular series of separate bodies whose centres are spaced at known angular distances, means for supporting said bodies suchwise that the circular series is concentrically disposed with respect to and revoluble with said spindle, and a device for setting and locking the spindle in an adjusted position, said device including a locking member which is bored axially and adapted to be moved into positive contact with a separate body after a required angular adjustment of the spindle has been effected and to be withdrawn clear of the bodies to release said spindle, and a yieldable member in the form of a core which is mounted for movement axially within the bore of the locking member and so arranged for yielding contact with the bodies as to be adapted to guide and maintain the locking member with its operative end correctly positioned with respect to said bodies, a part of the core and the corresponding portion of the aforesaid bore in which said part fits being formed in a complementary manner so as to prevent relative angular movement between the locking member and the core, for the purpose herein specified.

8. For attachment to a machine tool, an indexing head for rotating the work through required angles so that formations can be produced around said work in definite angular relationship, comprising, in combination, a housing, a spindle which is angularly adjustable within said housing and adapted when so adjusted to effect a required movement of the work, a circular series of separate bodies whose centres are spaced at known angular distances, means for supporting said bodies suchwise that the circular series is concentrically disposed with respect to and revoluble with said spindle, and a device for setting and locking the spindle in an adjusted position, said device including a locking member which is adapted to be moved into positive contact with a separate body after a required angular adjustment of the spindle has been effected and to be withdrawn clear of the bodies to release said spindle, manually operable means for impelling the locking member into contact with and locking it against a predetermined body at appropriate times, and a yieldable member which is so formed and arranged for yielding contact with the bodies as to be adapted to guide and maintain the locking member with its operative end correctly positioned with respect to said bodies.

9. For attachment to a machine tool, an indexing head for rotating the work through required angles so that formations can be produced around said work in definite angular relationship, comprising, in combination, a housing, a spindle which is angularly adjustable within said housing and adapted when so adjusted to effect a required movement of the work, a circular series of separate bodies whose centres are spaced at known angular distances, means for supporting said bodies suchwise that the circular series is concentrically disposed with respect to and revoluble with said spindle, and a device for setting and locking the spindle in an adjusted position, said device including a locking member, means for impelling said member into positive contact with and locking it against a predetermined separate body after a required angular adjustment of the spindle has been effected, spring means which are so associated with the locking member that upon release said member is withdrawn under the spring action clear of the bodies to free the spindle, and a yieldable member which is so formed and arranged for yielding contact with the bodies as to be adapted to guide and maintain the locking member with its operative end correctly positioned with respect to said bodies.

10. For attachment to a machine tool, an indexing head for rotating the work through required angles so that formations can be produced around said work in definite angular relationship, comprising, in combination, a housing, a spindle which is angularly adjustable within said housing and adapted when so adjusted to effect a required movement of the work, a circular series of separate bodies whose centres are spaced at known angular distances, means for supporting said bodies suchwise that the circular series is concentrically disposed with respect to and revoluble with said spindle, and a device for setting and locking the spindle in an adjusted position, said device including a locking member, means for impelling said member into positive contact with and locking it against a predetermined separate body after a required angular adjustment of the spindle has been effected, a spring in association with the locking member whereby, upon release, the latter is withdrawn under the spring action clear of the bodies to free the spindle, a member which is rendered yieldable by the same spring and so arranged for yielding contact with the bodies as to be adapted to guide and maintain the locking member with its operative end correctly positioned with respect to said bodies.

11. For attachment to a machine tool, an indexing head for rotating the work through required angles so that formations can be produced around said work in definite angular relationship, comprising, in combination, a housing, a bush which is mounted in said housing, a spindle which is angularly adjustable within said housing and adapted when so adjusted to effect a required movement of the work, a circular series of separate bodies whose centres are spaced at known angular distances, means for supporting said bodies suchwise that the circular series is concentrically disposed with respect to and revoluble with said spindle, and a device for setting and locking the spindle in an adjusted position, said device including a locking member which is adapted to be slidably moved within the aforesaid bush into positive contact with a separate body after a required angular adjustment of the spindle has been effected and to be withdrawn clear of the bodies to release said spindle, and a yieldable member which is so formed and arranged for yielding contact with the bodies as to be adapted to guide and maintain the locking member with its operative end correctly positioned with respect to said bodies.

12. For attachment to a machine tool, an indexing head for rotating the work through required angles so that formations can be produced around said work in definite angular relationship, comprising, in combination, a housing, a spindle which is angularly adjustable within said housing and adapted when so adjusted to effect a required movement of the work, a circular series of separate bodies whose centres are spaced at known angular distances, a support for said bodies which support is arranged so that the circular series is concentrically disposed with respect to and revoluble with said spindle, a ring which completely surrounds the series of separate bodies and holds them firmly in position upon the support, and a device for setting and locking the spindle in an adjusted position, said device including a movable locking member which is recessed to avoid the aforesaid ring and adapted to be moved into positive contact with a separate body after a required angular adjustment of the spindle has been effected and to be withdrawn clear of the bodies to free said spindle, and a yieldable member the inner end of which is bifurcated to stradle and thereby avoid the said ring, said yieldable member being so formed and arranged for yielding contact with the bodies as to be adapted to guide and maintain the locking member with its operative end correctly positioned with respect to said bodies.

13. For attachment to a machine tool, an indexing head for rotating the work through required angles so that formations can be produced around said work in definite angular relationship, comprising, in combination, a housing, a spindle which is angularly adjustable within said housing and adapted when so adjusted to effect a required movement of the work, a circular series of separate bodies whose centres are spaced at known angular distances, a circular carrier which is formed for reception of said bodies and arranged suchwise that the circular series is concentrically disposed with respect to and revoluble with the spindle, means for retaining the bodies in position in the carrier, the bodies, the carrier and said retaining means together constituting a self-contained unit constructed so as to be adapted for removal from the housing as occasion demands for any of the purposes herein specified, and a device for setting and locking the spindle in an adjusted position, said device including a locking member which is adapted to be moved into positive contact with a separate body after a required angular adjustment of the spindle has been effected and to be withdrawn clear of the bodies to release said spindle, and a yieldable member which is so formed and arranged for yielding contact with the bodies as to be adapted to guide and maintain the locking member with its operative end correctly positioned with respect to said bodies.

14. An indexing head according to claim 13, wherein the circular carrier consists of a circumferentially grooved annular part.

15. For attachment to a machine tool, an indexing head for rotating the work through required angles so that formations can be produced around said work in definite angular relationship, comprising, in combination, a housing, a spindle which has a hub and is angularly adjustable within said housing and adapted when so adjusted to effect a required movement of the work, a circular series of separate bodies whose centres are spaced at known angular distances, a circularly grooved annular carrier for the bodies which carrier is secured upon the hub so that the bodies are revoluble with the spindle, means for retaining the bodies in position in the carrier, the bodies, the carrier and said retaining means together constituting a self-contained unit constructed so as to be adapted for removal from the housing as occasion demands for any of the purposes herein specified, and a device for setting and locking the spindle in an adjusted position, said device including a locking member which is adapted to be moved into positive contact with a separate body after a required angular adjustment of the spindle has been effected and to be withdrawn clear of the bodies to release said spindle, and a yieldable member which is so formed and arranged for yielding contact with the bodies as to be adapted to guide and maintain the locking member with its operative end correctly positioned with respect to said bodies.

16. For attachment to a machine tool, an indexing head for rotating the work through required angles so that formations can be produced around said work in definite angular relationship, comprising, in combination, a housing, a spindle which has a hub and is angularly adjustable within said housing and adapted when so adjusted to effect a required movement of the work, a circular series of separate bodies whose centres are spaced at known angular distances, a circularly grooved annular carrier for the bodies which carrier is positioned upon the hub but formed for engagement with an extractor tool, a member which is engaged with the hub for normally maintaining said carrier in position upon the hub, means for retaining the bodies in position in the carrier, the bodies, the carrier and said retaining means together constituting a self-contained unit which is removable from the housing as occasion demands for any of the purposes herein specified, and a device for setting and locking the spindle in an adjusted position, said device including a locking member which is adapted to be moved into positive contact with a separate body after a required angular adjustment of the spindle has been effected and to be withdrawn clear of the bodies to release said spindle, and a yieldable member which is so formed and arranged for yielding contact with the bodies as to be adapted to guide and maintain the locking member with its operative end correctly positioned with respect to said bodies.

17. For attachment to a machine tool, an indexing head for rotating the work through required angles so that formations can be produced around said work in definite angular relationship, comprising, in combination, a housing, a spindle which is angularly adjustable within said housing and adapted when so adjusted to effect a required movement of the work, a series of separate bodies whose centres are spaced at known angular distances, means for supporting said bodies suchwise that the series is concentrically disposed with respect to and revoluble with said spindle, a device for setting and locking the spindle in an adjusted position, said device including a locking member which is adapted to be moved into positive contact with a separate body after a required angular adjustment of the spindle has been effected and to be withdrawn clear of the bodies to release said spindle, and a yieldable member which is so formed and arranged for yielding contact with the bodies as to be adapted to guide and maintain the locking member with its operative end correctly positioned with respect to said bodies, and means which are so formed and arranged together with the separate bodies as to enable the spindle, during adjustment, to be turned through angles other than those normally provided for by contiguously arranged separate bodies alone.

18. For attachment to a machine tool, an indexing head for rotating the work through required angles so that formations can be produced around said work in definite angular relationship, comprising, in combination, a housing, a spindle which is angularly adjustable within said housing and adapted when so adjusted to effect a required movement of the work, a circular series of separate bodies whose centres are spaced at known angular distances, means for supporting said bodies suchwise that the circular series is concentrically disposed with respect to and revoluble with said spindle, a device for setting and locking the spindle in an adjusted position, said device including a locking member which is adapted to be moved into positive contact with a separate body after a required angular adjustment of the spindle has been effected and to be withdrawn clear of the bodies to release said spindle, and a yieldable member which is so formed and arranged for yielding contact with the bodies as to be adapted to guide and maintain the locking member with its operative end correctly positioned with respect to said bodies, and at least one slip gauge of known angular extent which is inserted into a space provided by omission from the head of certain of the separate bodies, for the purpose herein set forth.

ALBERT LAMBERT JEAN GHAYE.